United States Patent [19]

Kajino et al.

[11] 4,274,652
[45] Jun. 23, 1981

[54] STRUCTURE FOR ATTACHING AN IMPLEMENT TO AN OFFSET-TYPE TRACTOR

[75] Inventors: Masayori Kajino, Osaka; Takashi Yoshii, Sakai; Tomeaki Tama, Hashimoto, all of Japan

[73] Assignee: Kubota, Ltd., Naniwa, Japan

[21] Appl. No.: 59,621

[22] Filed: Jul. 23, 1979

[30] Foreign Application Priority Data

Jul. 31, 1978 [JP] Japan .................................. 53-105902

[51] Int. Cl.³ .............................................. B60D 1/00
[52] U.S. Cl. .................... 280/460 A; 180/900; 280/461 A
[58] Field of Search .......... 280/460 A, 456 A, 461 A; 180/900

[56] References Cited

U.S. PATENT DOCUMENTS

| 2,247,668 | 7/1941 | Rosenthal | ............................. 180/900 |
| 3,031,208 | 4/1962 | Abbott | ............................. 280/460 A |

FOREIGN PATENT DOCUMENTS 571862 10/1958 Belgium ................................ 280/460 A Primary Examiner—John P. Silverstrim
Attorney, Agent, or Firm—Kane, Dalsimer, Kane, Sullivan and Kurucz

[57] ABSTRACT

For attaching an implement to an offset-type tractor with a top link and two lower links; a top-link-mounting bracket and a first and a second lower-link-mounting brackets are provided for the three links, respectively. The first lower-link-mounting bracket is fixed to an upper portion of an arm securely borne on and transversely protruding from a wall part of an offset transmission case of the tractor. The first lower-link-mounting bracket has on a lower portion thereof a first lower-link-mounting pin fixed thereto.

7 Claims, 5 Drawing Figures

STRUCTURE FOR ATTACHING AN IMPLEMENT TO AN OFFSET-TYPE TRACTOR

BACKGROUND OF THE INVENTION

This invention relates to a structure for attaching an implement, via a top link and two transversely detached lower links to an offset-type tractor defining a vertical longitudinal center plane and having a transmission case disposed transversely offset to one lateral side of the longitudinal center plane. A top-link mounting bracket is attached to a wall portion of the transmission case and is positioned substantially in the longitudinal center plane. A first and a second lower-link-mounting brackets are detached from each other on the respective lateral sides of the top-link-mounting bracket.

For attaching an implement, via a top link and two transversely detached lower links, to an offset-type tractor defining a vertical longitudinal center plane and having a transmission case disposed transversely offset to one lateral side deviating from the longitudinal center plane, as mentioned hereinabove, wherein the transmission case constitutes the main structural element of the rear end portion of the tractor body, it has conventionally been the normal case, for attaching the implement centrally rearwardly of the overall tractor body, to provide the particular one of the lower-link-mounting brackets, which is on the side near the longitudinal center plane, at a distance transversely apart from the transmission case in the direction opposite to the transversely offset deviating direction of the transmission case, with interconnecting distance piece means interposing therebetween.

Said interconnecting distance piece means being provided thus transversely projecting from the transmission case, tall stalks planted in rows are apt to be hit and damaged thereby when the tractor travels along the planted rows performing the intended work. For elimination of such drawbacks, both of the right and left lower-link-mounting brackets with respective mounting pins thereon may be provided at a considerable height on the tractor, but such high position of the lower-link-mounting pins will enlarge the implement drag moment and is thus undesirable for sturdy, stable mounting.

SUMMARY OF THE INVENTION

In view of the difficulties of the conventional structures as described above, this invention has as its object to provide a structure for attaching an implement to an offset-type tractor, which realizes sturdy, stable mounting of the implement and which minimizes the danger of damaging the planted stalks during travel of the tractor as caused by hitting them with the interconnecting distance piece means interposing between the transmission case and the lower-link-mounting bracket on the side near the longitudinal center plane of the tractor.

For this purpose, the structure according to this invention is characterized, in the type as described at the beginning, by: a mounting base assembly defining a rear surface thereof and detachably mounted to the rear wall portions of the transmission case; an inverted-L-shaped plate fixed to the rear surface of the mounting base assembly in such manner that the inverted L has the depending stem thereof on the side near the longitudinal center plane; an arm fixed to the depending stem portion of the inverted-L-shaped plate, to transversely project out therefrom to the side opposite to and remote from the transmission case, with an upper portion of the said first lower-link-mounting bracket fixed to this arm at the end of the transverse projection thereof; and a first and a second lower-link-mounting pins fixed to the first and the second lower-link-mounting brackets, respectively, to transversely project out therefrom both to the same side opposite to the transversely offset deviating direction of the transmission case, the first lower-link-mounting pin being fixed to a lower portion of the first lower-link-mounting bracket.

Thus, since the said arm is fixed to an upper portion of the first lower-link-mounting bracket and since the first-lower-link-mounting pin is fixed to a lower portion of the bracket, free space of considerable height above the soil is retained in the tractor structure in the portion transversely in between the first lower-link-mounting bracket and the transmission case, and it has thereby been made possible to minimize the danger of damaging the planted stalks even when the tractor is traveling over the considerably tall stalks.

And yet, since the first lower-link-mounting pin is fixed to a lower portion of the first lower-link-mounting bracket as mentioned already, it has now been made possible also to realize sturdy, stable mounting of the implement with ample vertical spacing between the upper and lower links.

Another object of this invention is to minimize the damage of the planted stalks even when they actually hit the said arm.

This object is attained according to this invention by constructing the said arm in a shape smoothly rounded at least in the lower surface portions thereof, thus to let the planted stalks, hitting same, escape smoothly sliding over the rounded surface thereof.

Still other objects of and advantages accruing from this invention will become apparent from the detailed description to follow hereunder.

BRIEF DESCRIPTION OF THE DRAWINGS

The drawings show, by way of example, a couple of embodiments of the offset-type tractor according to this invention, wherein.

DETAILED DESCRIPTION OF THE PREFERRED EMBODIMENTS

Figure 1:
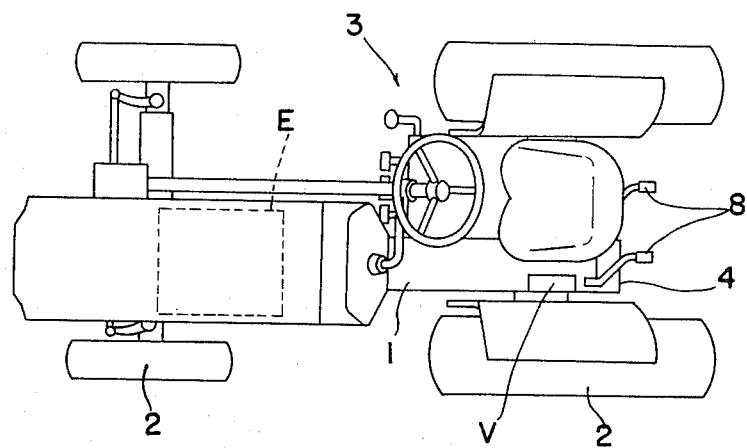
FIG. 1 is an overall plan view.
Figure 2:
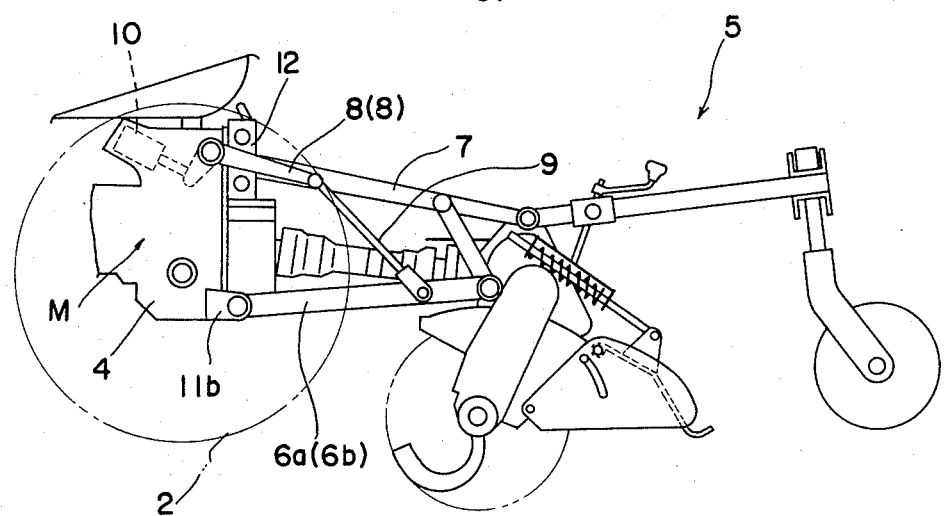
FIG. 2 is a side elevation of the portions essential to this invention of the tractor with the implement attached thereto.

The offset-type tractor shown in FIGS. 1 and 2 has a main frame 1 which is offset to one lateral side of the overall tractor body. Front and rear wheels 2 are journaled on the frame 1, and designated generally at 3 in FIG. 1 is the driver's quarter mounted also on the frame 1. On the offset frame 1 there are further mounted an engine E at a front portion thereof and a transmission case 4 at a rear portion therof, thus they are also transversely offset to one lateral side deviating from the longitudinal center plane of the overall tractor body.

Driving power of the engine E is transmitted through the interior of the frame 1 to a transmission M encased in the transmission case 4. An implement generally designated at 5 in FIG. 2 is operatively connected to the transmission case 4, thus to perform the intended work as the tractor travels.

Looking in detail into the operative connection between the transmission case 4 and the implement 5, the supporting mode is the so-called three-point support system, thus comprising a first and a second lower links 6a and 6b, respectively, and a top link 7, as well as a pair of right and left lift arms 8, with a rod 9 articulatingly interconnecting each of the first and the second lower links 6a, 6b and the lift arm 8 on the same side. The lift arms 8 may be rocked up and down by actuating a hydraulic cylinder 10 and the implement 5 may thus thereby be raised and lowered.

Figure 3:
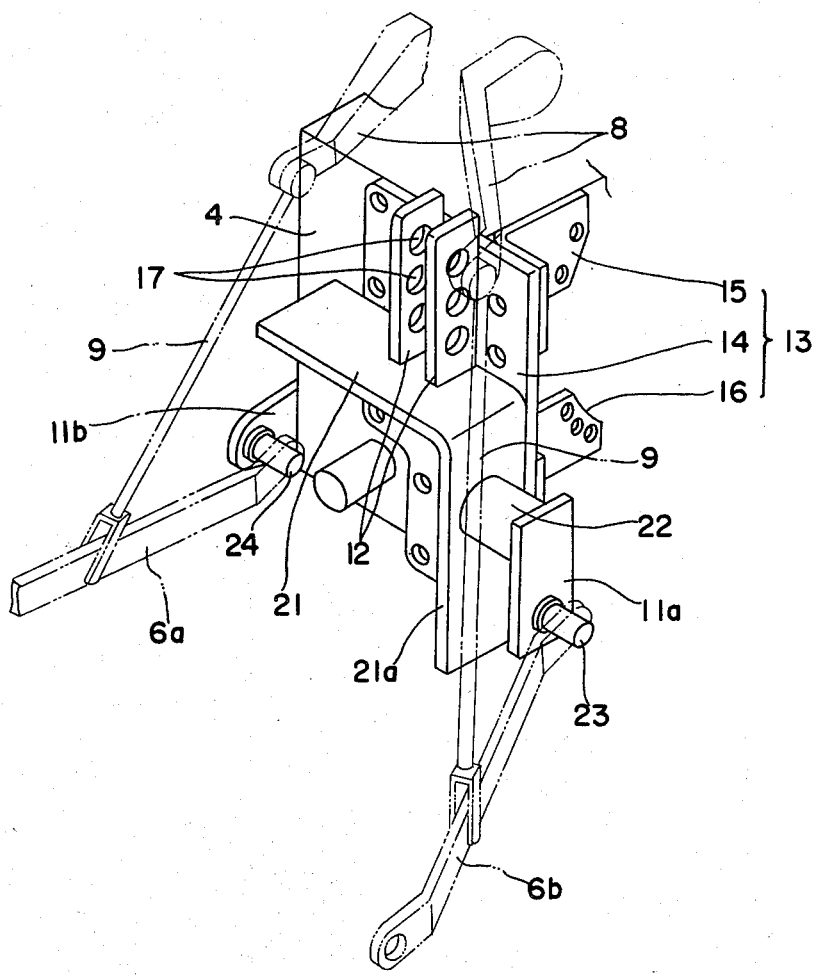
FIG. 3 is an enlarged perspective view of the essential portions.

As best seen in FIG. 3, first and second lower-link-mounting brackets 11a and 11b are provided for mounting the first and the second lower links 6a and 6b, respectively, to the tractor body. Of these two brackets, the first lower-link-mounting bracket 11a is the one positioned on the side opposite to the transversely offset deviating direction of the transmission case 4. Similarly, a top-link-mounting bracket 12 is provided for mounting the top link 7 to the tractor body. The said first lower-link-mounting bracket 11a and also the top-link-mounting bracket 12 are positioned outside the transmission case 4 on the said side opposite to the transversely offset deviating direction of the transmission case 4.

For mounting these two brackets, namely the first lower-link-mounting bracket 11a and the top-link-mounting bracket 12, to the transmission case 4, there is provided a mounting base assembly 13 to function as an intermediary with both of the said two brackets 11a and 12 borne thereon, more particularly the latter directly and the former via an arm 22 described in more detail later in this specification.

The mounting base assembly 13 itself is made to be mounted on the transmission case 4, and comprises a platelike member 14 lying on and along the rear surface of the transmission case 4. First and second stays 15, 16 are fixed thereon and lie on and along a lateral side surface of the transmission case 4 on the side opposite to the offset direction thereof. Assembly 13 is accordingly supported on two different faces of the case 4 for greater supporting strength.

The top-link-mounting bracket 12 is made with mounting apertures 17 perforated therein at proper vertical intervals, thus making it possible to adjust the mounting position of the top link 7 by selecting the mounting apertures 17 actually used.

Designated at 21 is an inverted-L-shaped plate fixed to the rear surface of the mounting base assembly 13 in such manner that the inverted L has the depending stem 21a thereof on the side opposite to the said transversely offset deviating direction of the transmission case 4. An arm 22 is fixed to the depending stem 21a of the inverted L-shaped plate and transversely projects therefrom in a direction opposite to the offset direction of the transmission case 4. An upper portion of bracket 11a is fixed to this arm 22 at its projecting end. In the illustrated embodiment, arm 22 is cylindrical. Relatively tall stalks hitting the arm 22 may smoothly slide thereon such that damage is minimized. As will be appreciated substantially the same effect will be obtained if the arm 22 is shaped to be smoothly rounded at least in the lower surface portions thereof.

Designated at 23 and 24 are a first and second lower-link-mounting pins, fixed to the first and the second lower-link-mounting brackets 11a and 11b, respectively, to transversely project out therefrom both to the same side opposite to the transversely offset deviating direction of the transmission case 4. The first lower-link-mounting pin 23 is fixed to a lower portion of the first lower-link-mounting bracket 11a. The second lower-link-mounting bracket 11b is in the illustrated instance mounted directly to a lower portion of the transmission case 4.

However, the second lower-link-mounting bracket 11b may as well preferably be provided to be borne on the said mounting base assembly 13, so that by fixing up the mounting base assembly 13, with the brackets 11a and 11b securely borne thereon beforehand, both of the brackets 11a and 11b may all at a single stroke be attached to the transmission case 4.

Furthermore, the said mounting base assembly 13 may as well preferably be provided to be mounted as supported on the rear end surface and both of the lateral side surfaces of the transmission case 4, thus on three faces thereof in all, to better enhance the supporting strength.

Figure 4:
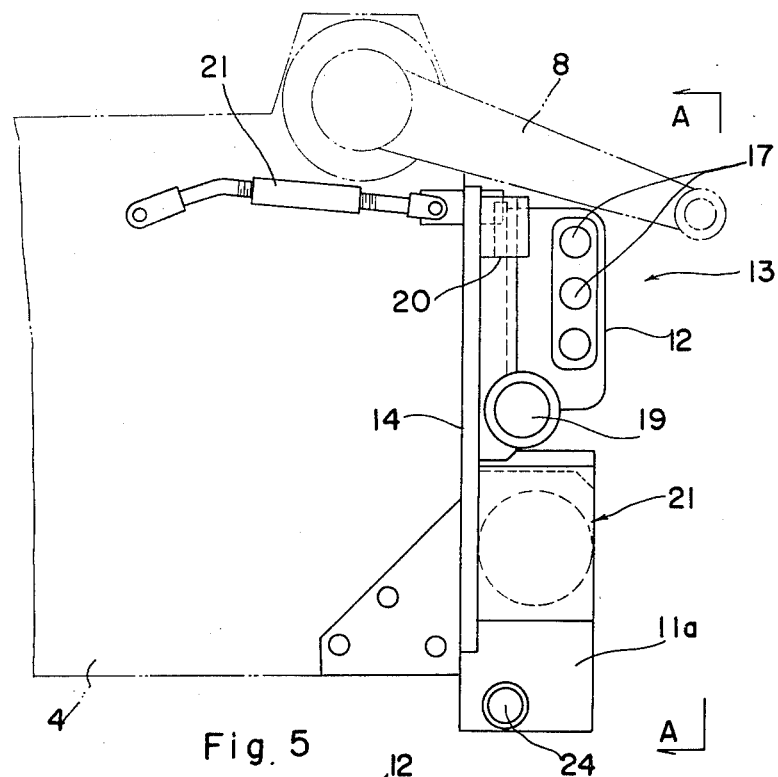
FIG. 4 is a side elevation of the essential portions of another embodiment and FIG. 5 is a rear end view as viewed according to arrows A—A in FIG. 4.
Figure 5:
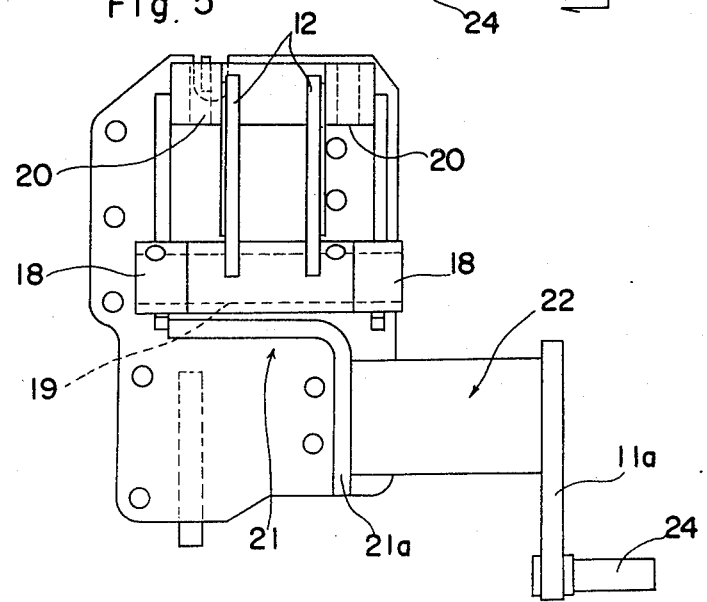

FIGS. 4 and 5 show a modified embodiment of the implement-attaching structure. Here, a pair of boss portions 18 are provided as protrusions on the mounting base assembly 13, and a torsion bar 19 is provided to extend between and be journalded in the boss portions 18. In this embodiment, the top-link-mounting bracket 12 is fitted on the said torsion bar 19, with secure connection made between the torsion bar 19 and one of the bosses 18 and also with secure connection made between the torsion bar 19 and the top-link-mounting bracket 12 on the side near the other boss 18. Here, the top-link-mounting bracket 12 in the illustrated instance is interlockingly connected with a control valve V (roughly shown in FIG. 1) for the said hydraulic cylinder 10 via a turnbuckle 21, so that in the case the implement such as a plow is attached, the torsion bar 19 as is twisted in accordance with increase in the soil-engaging load of the implement thus accordingly causing displacement of the top-link-mounting bracket 12 toward the mounting base assembly 13 may thereby automatically actuate the control valve V for raising the implement and thus may automatically reduce back the soil-engaging load.

Designated in FIGS. 4 and 5 at 20 are stopper plates of angled sectional shape in plan view (not shown), for blocking the top-link-mounting bracket 12 from coming apart beyond a predetermined distance from the mounting base assembly 13 even when for instance the implement is lifted up, thus preventing injury to the torsion bar 19.

We claim:

1. In an offset-type tractor having a vertical, longitudinal center plane, and a transmission case disposed offset to one lateral side of said center plane, the improvement comprising means for mounting a three point implement hitch to said transmission case, said hitch including a top link and first and second, laterally spaced lower links, said mounting means comprising: a mounting base assembly detachably mounted to the rear of said transmission case; a plate fixed to said base assembly and projecting rearwardly therefrom; an arm having one end fixed to said plate and a second end projecting laterally from said tractor; a first bracket having an upper end fixed to said second end of said arm, and a lower end; means for pivotally mounting said first lower link to said lower end of said first bracket; a second bracket fixed to said base assembly on said one lateral side of said center plane; means for pivotally mounting said second lower link to said second bracket; an upper bracket mounted on said base assembly; and means for pivotally mounting said upper link to said upper bracket.

2. The structure of claim 7, wherein the second bracket is mounted directly to a lower portion of the transmission case.

3. The structure of claim 2, wherein the mounting base assembly is mounted to different two wall faces of the transmission case.

4. The structure of claim 2, wherein the said arm is shaped to be smoothly rounded at least in the lower surface portions thereof.

5. The structure of claim 4, wherein the arm (22) is cylindrical in shape.

6. The strcture of claim 4 or 5, wherein the second bracket is mounted directly to the mounting base assembly.

7. The structure of claim 1, wherein said plate is an inverted L-shaped plate.

* * * * *